United States Patent
Kikushima

(10) Patent No.: US 8,679,721 B2
(45) Date of Patent: Mar. 25, 2014

(54) ELECTROSTATIC CHARGE IMAGE DEVELOPING TONER, ELECTROSTATIC CHARGE IMAGE DEVELOPER, AND IMAGE FORMING APPARATUS

(75) Inventor: Seiji Kikushima, Osaka (JP)

(73) Assignee: Kyocera Mita Corporation (JP)

( * ) Notice: Subject to any disclaimer, the term of this patent is extended or adjusted under 35 U.S.C. 154(b) by 225 days.

(21) Appl. No.: 13/113,142

(22) Filed: May 23, 2011

(65) Prior Publication Data

US 2011/0294057 A1  Dec. 1, 2011

(30) Foreign Application Priority Data

May 27, 2010 (JP) ................................ 2010-121642
Mar. 25, 2011 (JP) ................................ 2011-068663

(51) Int. Cl.
*G03G 15/08* (2006.01)

(52) U.S. Cl.
USPC .............. 430/124.1; 430/105; 430/108.6; 430/108.1

(58) Field of Classification Search
USPC .............. 430/108.1–111.1, 108.6, 124.1, 105
See application file for complete search history.

(56) References Cited

U.S. PATENT DOCUMENTS

2004/0185367 A1 * 9/2004 Serizawa et al. ............. 430/124
2007/0020543 A1 * 1/2007 Nakatani .................... 430/108.4

FOREIGN PATENT DOCUMENTS

| JP | 54-86341 | | 7/1979 |
| JP | 2003-107787 | | 4/2003 |
| JP | 2003-107789 | | 4/2003 |
| JP | 2004177856 A | * | 6/2004 |
| JP | 2004-349167 | | 12/2004 |

OTHER PUBLICATIONS

Handbook of Imaging Materials, Arthur S. Diamond, New York, 2002.*

English translation of JP 2004-177856, Jun. 2004, Japan, Asahani et al.*

* cited by examiner

*Primary Examiner* — Mark F Huff
*Assistant Examiner* — Rashid Alam
(74) *Attorney, Agent, or Firm* — Gerald E. Hespos; Michael J. Porco; Matthew T. Hespos

(57) ABSTRACT

The present disclosure aims to provide a toner that is capable of keeping a photoreceptor drum in satisfactory condition for a long period of time and preventing the occurrence of pinholes on the photoreceptor drum, which plays a key role in forming images. The present disclosure provides an electrostatic charge image developing toner in which an external additive is added to toner base particles, wherein the external additive includes inorganic fine particles attached with conductive fine particles, and the conductive fine particles are attached to the inorganic fine particles with certain strength.

5 Claims, No Drawings

ELECTROSTATIC CHARGE IMAGE DEVELOPING TONER, ELECTROSTATIC CHARGE IMAGE DEVELOPER, AND IMAGE FORMING APPARATUS

BACKGROUND OF THE INVENTION

1. Field of the Invention

The present disclosure relates to an electrostatic charge image developing toner, electrostatic charge image developer, and image forming apparatus that are used in an electrophotographic system.

2. Description of the Related Art

In a copy machine, printer, digital multi-functional peripheral and other image forming apparatuses for forming images on sheets of paper using an electrophotographic system, electrostatic charge images (electrostatic latent images) are formed on circumferential surfaces of photoreceptor drums serving as image carriers, and these electrostatic charge images are developed into toner images by a developing device using a toner. The toner images on the photoreceptor drums are transferred onto a sheet by a transfer device, and then heated and pressurized by a fixing device, in order to be fixed on the sheet. The sheet having the toner images fixed thereon is eventually discharged to the outside of the image forming apparatus.

With a view to reducing the effects on the environment and running costs, those units that are used in an electrophotographic process are designed to have long lives. Above all, the photoreceptor drums, playing a key role in forming images, have been required for keeping the stable conditions thereof for a long period of time.

In order to withstand long-term use, amorphous silicon photoreceptors have been used as the photoreceptor drums due to their wear resistance of surfaces thereof.

Furthermore, an image forming apparatus, in which the amorphous silicon photoreceptors are used, uses a toner that contains fine particles containing a predetermined percentage of zinc oxide and metallic elements other than zinc elements, for the purpose of providing the toner with fluidity and enhancing the cleaning characteristics of the toner.

However, because the amorphous silicon photoreceptors exhibit wear resistance, the surfaces of these photoreceptors need to be so designed that they are polished, by adding an abrasive compound or the like to the toner so that the surfaces are not contaminated by discharge products that are generated from charging rollers and the like during a charging process. The technology described above, however, does not take such a problem into consideration sufficiently.

In addition, in order to keep the photoreceptor drums in good condition for a long period of time, it is important to prevent the generation of pinholes on the photoreceptor drums, which are caused by separation discharge when a non-transferred toner is recovered by a cleaning blade. When there is no sufficiently low-resistance external additive layer around an edge of the cleaning blade, the pinholes are caused as electric charges accumulate in the toner entering an edge area between the cleaning blade and the photoreceptor drum, and, consequently photoreceptor layers are damaged by the discharge that is caused when voltage generated by the accumulated electric charges in the toner exceeds withstanding voltage of the photoreceptor layers. The pinholes are easily caused when a large amount of toner is recovered at once. Since the parts on the photoreceptor drum with pinholes are not charged, unwanted colored spots are generated on an image formed on a sheet.

SUMMARY OF THE INVENTION

The present disclosure was contrived in view of the above circumstances, and an object thereof is to provide a toner that is capable of keeping the photoreceptor drums in satisfactory condition for a long period of time and preventing the occurrence of pinholes on the photoreceptor drums, which play a key role in forming images.

As a result of dedicated research, the inventors of the present disclosure have discovered that the object described above can be accomplished by using an electrostatic charge image developing toner having the following configuration, and have achieved the present disclosure with further investigation based on this discovery.

In other words, one aspect of the present disclosure is an electrostatic charge image developing toner in which an external additive is added to toner base particles, wherein the external additive includes inorganic fine particles attached with conductive fine particles, and the conductive fine particles are attached to the inorganic fine particles such that an existence ratio of the conductive fine particles in a non-transferred toner (conductive fine particles/non-transferred toner) is 9.5 to 30 times an existence ratio of the conductive fine particles in an initial toner (conductive fine particles/initial toner), the non-transferred toner being a toner that remains on a surface of a photoreceptor after an image is transferred to a surface of a transfer sheet or a surface of an intermediate transfer body.

Another aspect of the present disclosure is an electrostatic charge image developer, which includes the electrostatic charge image developing toner and a carrier.

Yet another aspect of the present disclosure is an image forming apparatus, which uses the electrostatic charge image developing toner or the electrostatic charge image developer. According to this configuration, an image forming apparatus that achieves various mechanisms can be obtained.

DETAILED DESCRIPTION OF THE PREFERRED EMBODIMENTS

Electrostatic Charge Image Developing Toner

The electrostatic charge image developing toner according to the present disclosure is obtained by adding an external additive to toner base particles. The external additive includes inorganic fine particles attached with conductive fine particles. The conductive fine particles are attached to the inorganic fine particles such that the existence ratio of the conductive fine particles in a non-transferred toner (conductive fine particles/non-transferred toner) is 9.5 to 30 times the existence ratio of the conductive fine particles in an initial toner (conductive fine particles/initial toner), the non-transferred toner being a toner that remains on a surface of a photoreceptor after an image is transferred to a surface of a transfer sheet or on a surface of an intermediate transfer body.

According to this configuration, the inorganic fine particles, which function as an abrasive compound in the toner used in an electrophotographic system, remain on a photoreceptor drum when transferring the toner from the photoreceptor drum to the intermediate transfer body or a sheet, and are, consequently, selectively accumulated on the surface of the photoreceptor. As a result, a cleaning blade or friction roller uses a sufficient amount of the abrasive compound to polish the surface of the photoreceptor drum. Furthermore, since the inorganic fine particles, attached with the conductive fine particles, are externally added to the toner, the conductive fine particles become present within a recovery path with an electrostatic charge image carrier (the photoreceptor drum) without being transferred selectively to the intermediate transfer body or the sheet. This can prevent the photoreceptor drum from being damaged by separation discharge of the toner that is caused when recovering the non-transferred toner. In addition, attaching the low-resistance conductive fine particles to the inorganic fine particles at low attachment strength can allow an edge part of the cleaning blade to form a low-resistance external additive layer, which can prevent the generation of pinholes on the photoreceptor drum for a long period of time.

Therefore, the present disclosure, which is an electrophotographic image forming apparatus, is capable of preventing the generation of pinholes on the photoreceptor drum, thoroughly polishing the surface of the photoreceptor drum even when an amorphous silicon photoreceptor or other photoreceptor exhibiting wear resistance is used as the photoreceptor drum, and thereby keeping the photoreceptor drum, which plays a key role in forming images, in good condition for a long period of time, and reducing the effects on the environment and running costs.

The toner base particles and the external additive that configure the toner of the present disclosure are described below in detail.

<Toner Base Particles>

The toner base particles are obtained by blending a colorant, release agent, or charge-controlling agent into a binder resin. The toner particles are produced by, for example, mixing these ingredients in a blender, melt-kneading this mixture with an extruder, cooling it, and then pulverizing and classifying the resultant solid matter. The volume average particle diameter of the toner base particles is 2 to 12 μm, preferably 4 to 10 μm, and more preferably 6 to 8 μm.

(Binder Resin)

Conventional binder resins for toner base particles can be used as the binder resin of the present disclosure without any restrictions. Specific examples of such binder resins used in the present disclosure include styrene resin, acrylic resin, styrene-acrylic resin, polyethylene resin, polypropylene resin, vinyl chloride resin, polyester resin, polyamide resin, polyurethane resin, polyvinyl alcohol resin, vinyl ether resin, N-vinyl resin, styrene-butadiene resin, and other thermoplastic resins. One of these resins may be used alone, or a combination of two or more of them may be used.

In the present disclosure, it is preferred that any of the abovementioned thermoplastic resins be used as the binder resin in terms of their good fixability; however, the thermoplastic resin may not be used alone, and, instead, a cross-linker may be added thereto or for a part of the binder resin thermosetting resin may be used. Introducing partially a cross-linking structure into the binder resin can improve preservation stability, configuration retention or durability of the toner without lowering the fixability.

Examples of thermosetting resins that can be used in the present disclosure include bisphenol A-type epoxy resin, hydrogenated bisphenol A-type epoxy resin, novolac-type epoxy resin, polyalkylene ether-type epoxy resin, cyclic aliphatic epoxy resin, and cyanate resin. One of these resins may be used alone, or a combination of two or more types of them may be used.

It is preferred that the glass-transition temperature of the binder resin be, for example, 50 to 70 C.° and preferably 55 to 65 C.°. When the glass-transition temperature of the binder resin is less than 50 C.°, toner adhesion occurs inside a developing device during the operation of the image forming apparatus or inside a toner container at the time of storage or transportation of the toner, leading to a reduction in preservation stability of the toner. On the other hand, the glass-transition temperature of the binder resin above 70 C.° tends to lower low-temperature fixability of the toner.

(Colorant)

Conventional colorants for monochrome toners or color toners can be used as the colorant of the present disclosure without any restrictions. Specific examples of such colorants include a black pigment such as carbon black, a yellow pigment such as pigment yellow 180, an orange pigment such as molybdenum orange, a red pigment such as C.I. pigment red 238, a purple pigment such as methyl violet lake, a blue pigment such as phthalocyanine blue, a green pigment such as pigment green B, and various other dyes.

In the present disclosure, the blending quantity of the colorant is, for example, 1 to 15 parts by mass with respect to 100 parts by mass of the binder resin.

(Release Agent)

In the present disclosure, the release agent is blended for the purpose of improving the fixability of the toner and preventing the reduction of toner offset characteristics. Conventional release agents for toner base particles can be used as the release agent of the present disclosure without any restrictions. Specific examples of such release agents include polyethylene wax, polypropylene wax, Teflon™ wax, Fischer-Tropsch wax, paraffin wax, ester wax, carnauba wax, montan wax, and rice wax. One of these waxes may be used alone, or a combination of two or more of them may be used.

In the present disclosure, the blending quantity of the release agent is, for example, 1 to 10 parts by mass with respect to 100 parts by mass of the binder resin. Less than 1 part by mass of the release agent might not be able to adequately achieve the improvement of the fixability of the toner or prevention of the reduction of toner offset characteristics. On the contrary, the blending quantity above 10 parts by mass tends to cause the toner adhesion, leading to a reduction in preservation stability of the toner.

(Charge-Controlling Agent)

In the present disclosure, the charge-controlling agent is blended for the purpose of maintaining the amount of charge of the toner and improving the rising characteristics of toner charging (the characteristics that the toner is charged to a predetermined charge amount in a short period of time). A positively chargeable charge-controlling agent is used for positively charging the toner in preparation for image development, and a negatively chargeable charge-controlling agent is used for negatively charging the toner in preparation for image development.

In the present disclosure, conventional positively chargeable charge-controlling agents for toner base particles can be used without any restrictions. Specific examples of such charge-controlling agents include pyridazine, pyrimidine, pyrazine, ortho-oxazine, meth-oxazine, para-oxazine, ortho-thiazine, meth-thiazine, para-thiazine, 1,2,3-triazine, and other azine compounds. One of these azine compounds may be used alone, or a combination of two or more of them may be used.

In the present disclosure, conventional negatively chargeable charge-controlling agent can be used without any restrictions. Specific examples of such charge-controlling agents include organic metallic complexes such as acetylacetone metallic complex and metallic salicylate complex, as well as chelate compounds such as aluminum acetylacetonate and iron (II) acetylacetonate. One of these components may be used alone, or a combination of two or more of them may be used.

In the present disclosure, the blending quantity of the charge-controlling agent is, for example, 0.5 to 15 parts by mass with respect to 100 parts by mass of the binder resin. When the blending quantity of the charge-controlling agent is less than 0.5 parts by mass, the image density decreases or fogging occurs more frequently. On the other hand, the blending quantity of the charge-controlling agent above 15 parts by mass is not preferred as it causes poor charging/image formation more frequently under high temperature and humidity.

<External Additive>

(Inorganic Fine Particles)

The external additive play a key role in the present disclosure, and the inorganic fine particles are used as the external additive. Conventional external additives for toner base particles are used as the inorganic fine particles of the present disclosure without any restrictions. Specific examples available include, preferably, titanium oxide and aluminum oxide used as the abrasive compound, as well as inorganic fine particles typified by silica, magnetite and the like used as a fluidizer. Above all, titanium oxide is preferred in terms of its excellent abrasive characteristics.

The average primary particle diameter or the inorganic fine particles used in the present disclosure is normally 150 to 350 nm and preferably 200 to 300 nm. When the particle diameter of the inorganic fine particles is less than 100 nm or above 500 nm, it becomes difficult to attach the conductive fine particle, described hereinafter, to the inorganic fine particles.

Note that, in the present disclosure, a magnified picture of the inorganic fine particles is taken using an electron microscope or an optical microscope, and then the average primary particle diameter is obtained using an image analyzer. The diameter or the largest dimension of each particle is taken as a primary particle diameter, and the average value of the primary particle diameters of the particles is taken as the average primary particle diameter.

(Conductive Fine Particles)

The inorganic fine particles are attached with the conductive fine particles, such that the existence ratio of the conductive fine particles in the non-transferred toner (conductive fine particles/non-transferred toner) is 9.5 to 30 times the existence ratio of the conductive fine particles in the initial toner (non-used toner: toner stored in a toner cartridge) (conductive fine particles/initial toner), the non-transferred toner being a toner that remains on the surface of the photoreceptor after an image is transferred to the surface of the transfer sheet or the surface of the intermediate transfer body. The pinhole prevention effect and other effects of the present disclosure cannot be realized when the existence ratio is less than 9.5 times. On the other hand, the existence ratio above 30 times is not preferred, because poor charging occurs where the potential of the charged photoreceptor drum surface becomes lower than a specified value as a result of long-term contact between a large amount of conductive fine particles and the photoreceptor drum surface, the large amount of conductive fine particles being deposited on the cleaning blade when the image forming apparatus is not in use, and the poor charging creates unnecessary lines on a formed image.

The conductive fine particles used in the present disclosure can be, for example, any oxide fine particles with electrical conductivity, and tin oxide conductive fine particles, zinc oxide conductive fine particles and the like can be preferably used.

Examples of the tin oxide conductive fine particles include antimony-doped tin oxide (ATO) fine particles, indium-doped tin oxide (ITO) fine particles, and fluorine-doped tin oxide (FTO) fine particles. Examples of the zinc oxide conductive fine particles include aluminum-doped zinc oxide (AZO) fine particles and gallium-doped zinc oxide (GZO).

The average primary particle diameter of the conductive fine particles used in the present disclosure is normally 5 to 30 nm and preferably 10 to 20 nm. As long as this average primary particle diameter falls within these ranges, the conductive fine particles can be attached to the inorganic fine particles at appropriate attachment strength according to the present disclosure. When the particle diameter of the conductive fine particles is less than 10 nm or above 30 nm, the conductive fine particles cannot be attached to the inorganic fine particles at an appropriate strength, the result of which is unsatisfactory.

Moreover, with regard to the external additive of the present disclosure the blend ratio of the inorganic fine particles to the conductive fine particles is preferably 100 parts by mass to 5 to 50 parts by mass, and more preferably 100 parts by mass to 9.5 to 30 parts by mass. At this blend ratio, plenty of conductive fine particles become present within the non-transferred toner, whereby the effects of the present disclosure can be achieved reliably.

(Method for Attaching the Conductive Fine Particles)

A method for attaching the conductive fine particles to the inorganic fine particles is not particularly limited as long as the conductive fine particles can be attached to the inorganic fine particles such that the existence ratio of the conductive fine particles in the non-transferred toner (conductive fine particles/non-transferred toner) is 9.5 to 30 times the existence ratio of the conductive fine particles in the initial toner (conductive fine particles/initial toner), the non-transferred toner being a toner that remains on the surface of the photoreceptor after an image is transferred to the surface of the transfer sheet or the surface of the intermediate transfer body.

More specifically, for instance, the existence ratio of the conductive fine particles in the non-transferred toner that is discharged from a photoreceptor unit after transferring an image to a moderate number of transfer sheets (e.g., 100,000 transfer sheets), and the existence ratio of the conductive fine particles in unused initial toner, are calculated by measuring, using a fluorescent X-ray measuring device, the green strength of each element derived from the conductive fine particles (e.g., tin (Sn), antimony (Sb), indium (In), gallium (Ga), aluminum (Al), etc.) within each of these toners, and then the conductive fine particles may be attached to the inorganic fine particles so that the existence ratio of the conductive fine particles in the non-transferred toner is 9.5 to 30 times the existence ratio of the conductive fine particles in the initial toner.

Here, externally adding the inorganic fine particles to the toner does not mean that the inorganic fine particles are attached completely to the toner, but means that the inorganic fine particles are also mixed in the developer. An alternating electric field is applied between a developing roller of the developing device and the photoreceptor. It is expected that while the alternating electric field reciprocates the toner between the developing roller and the photoreceptor, most of the inorganic fine particles move from the developing roller toward the photoreceptor so as to be attached to the photoreceptor, and do not return to the developing roller. In this case, the conductive fine particles move toward the photoreceptor along with the inorganic fine particles. Subsequently, in a transfer step or the like, the conductive fine particles are separated from the inorganic fine particles. It is expected that, after the separation, the inorganic fine particles are transferred and moved from the photoreceptor to the intermediate transfer body or a recording medium. However, because the particle diameter of the conductive fine particles is extremely small, most of the conductive fine particles remain on the photoreceptor without being transferred, and are then recovered to a cleaning unit. It is expected that the toner moves from the developing roller to the photoreceptor only upon the image development, and the toner that has not been transferred remains on the photoreceptor to be collected by the cleaning unit. As a result, the existence ratio of the conductive fine particles within the non-transferred toner and the existence ratio of the conductive fine particles within the initial toner can fall within the ranges mentioned earlier.

When the conductive fine particles are attached to the inorganic fine particles at excessively high attachment strength, the conductive fine particles cannot be separated from the inorganic fine particles even in the transfer step. When the attachment strength is excessively low, the conductive fine particles are separated from the inorganic fine particles prior to the transfer step. Therefore, the conductive fine particles need to be attached to the inorganic fine particles at appropriate attachment strength.

Examples of modes for implementing the method for attaching the conductive fine particles include the examples described hereinbelow.

Because the toner has the external additive that includes the inorganic fine particles to which the low-resistance conductive fine particles are attached at low attachment strength, the inorganic fine particles serving as the abrasive compound, as well as the conductive fine particles, become present within the recovery circuit including the photoreceptor drum and accumulate on the surface of the photoreceptor drum, so as to thoroughly polish the surface of the photoreceptor drum. The electrical conductivity provided to the abrasive compound prevent the generation of pinholes on the photoreceptor drum, which are caused by separation discharge when the non-transferred toner is recovered by the cleaning blade or the like. Consequently, the photoreceptor drum can be used in good condition for a long period of time.

(Other Components)

In addition to the external additive of the toner, not only the inorganic fine particles attached with the conductive fine particles, but also a conventional external additive for a toner can be used without any restrictions. Specific example thereof include fumed silica produced by a dry high-temperature hydrolysis method (a dry method for gasifying silicon chloride such as silicon tetrachloride and synthesizing silica fine particles based on the gas phase reaction of the silicon tetrachloride in a hydrogen flame at high temperature), silica produced by a deflagration method (a dry method for oxidizing silicon in an oxygen stream, vaporizing it with its reaction heat, and synthesizing silica fine particles by cooling the vaporized silicon), silica produced by a sol-gel method (a wet method for synthesizing silica fine particles by hydrolyzing alkoxy silane), silica produced by a colloidal method (a wet method for synthesizing silica fine particles by hydrolyzing liquid glass), titania synthesized by a sulfur method, chlorine method, or dry high-temperature hydrolysis method, alumina, magnesia, zinc oxide, silicon carbide, metal soap, uncompounded resin fine particles. One of these components may be used alone, or a combination of two or more of them may be used.

The blend ratio of the toner base particles to the components of the external additive other than the inorganic fine particles attached with the conductive fine particles is preferably 100 parts by mass to 1 to 10 parts by mass, and more preferably 100 parts by mass to 2 to 5 parts by mass.

(External Addition Process, the Amount of Additive, Etc.)

In the present disclosure, depending on the circumstances, the surface of the external additive may be applied to a hydrophobizing process by using silicone oil, silane coupling agent such as aminosilane and hexamethyldisilazane, or titanate coupling agent.

An external addition process for preparing the toner by adding the external additive to the toner base particles is performed by agitating and mixing the toner base particles with the external additive by means of a dry method. In so doing, the agitation and mixing may be performed using a Henschel mixer, a turbula mixer, or a super mixer, so that the external additive, which is in the form of fine particles, are not buried in the surfaces of the toner base particles.

In the present disclosure, the external additive can be added to the toner base particles in an amount that is used conventionally, but the present disclosure is not limited to this example. For instance, the external additive in an amount of 0.5 to 10 parts by mass or preferably 2 to 5 parts by mass can be added to the toner base particles in an amount of 100 parts by mass.

[Electrostatic Charge Image Developing Developer]

The electrostatic charge image developing toner according to the present disclosure can be used alone as a one-component developer or a two-component developer having a carrier mixed therein. In other words, the one-component developer means an electrostatic charge image developing developer that contains the electrostatic charge image developing toner having the configurations described above. The two-component developer means an electrostatic charge image developing developer that contains a carrier and the electrostatic charge image developing toner having the configurations described above. Hereinafter, the two-component developer is mainly described, but the description can be applied to the one-component developer as well.

<Carrier>

A conventional carrier for a two-component developer can be used as the carrier of the present disclosure without any restrictions. Specific examples thereof include a carrier in which a surface of a carrier core material is coated with resin.

Examples of the carrier core material include magnetic metals such as iron, nickel and cobalt; alloy of these metals; alloy comprising rare earth; soft ferrites such as hematite, magnetite, manganese-zinc ferrite, nickel-zinc ferrite, manganese-magnesium ferrite and lithium ferrite; iron-based oxides such as copper-zinc ferrite; and magnetic particles that are produced by sintering or atomizing a mixture of these magnetic materials.

As the resin used for coating the surface of the carrier core material, for example, polytetrafluoroethylene, polychlorotrifluoroethylene, polyvinylidene fluoride, tetrafluoroethylene/hexafluoropropylene copolymer (FEP), tetrafluoroethylene/perfluoroalkoxyethylene copolymer (PFA) and other fluorine resins, polyamide resin, acrylic resin, straight silicon and the like can be used.

The particle diameter of the carrier is 15 to 100 μm, preferably 20 to 70 μm, and more preferably 25 to 50 μm, when viewed under an electron microscope. The apparent specific gravity of the carrier varies depending on the compositions or surface structures of the magnetic materials, but is generally within a range of, preferably, 3000 to 8000 kg/m$^3$.

The two-component developer can be prepared by agitating and mixing the toner with the carrier by means of a dry method using a ball mill. The toner density in the two-component developer is 3 to 20 percent by mass, preferably 5 to 15 percent by mass, and more preferably 6 to 10 percent by mass. When the toner density is less than 3 percent by mass, the image density may decrease significantly. When, on the other hand, the toner density exceeds 20 percent by mass, the toner may scatter out of the developing device during the operation of the image forming apparatus, causing fogging or contaminating the inside of the image forming apparatus.

[Image Forming Apparatus]

The image forming apparatus according to the present disclosure uses the electrostatic charge image developing toner alone as the one-component developer, or uses a mixture of the electrostatic charge image developing toner and the carrier as the two-component developer, the electrostatic charge image developing toner having the configurations described above. The image forming apparatus generally has a photoreceptor drum (image carrier), on a circumferential surface of which is formed an electrostatic charge image (electrostatic latent image), and the developing device for developing the electrostatic charge image on the photoreceptor drum by using the toner. In the present disclosure, the toner here is the electrostatic charge image developing toner having the configurations described above.

A charging device, exposure device, developing device, transfer device, and cleaning device are disposed around the photoreceptor drum.

An organic photoreceptor (OPC) or amorphous silicon photoreceptor can be used as the photoreceptor drum, but it is preferred to use a long-life amorphous silicon photoreceptor. The charging device causes corona discharged to impart a predetermined potential to the circumferential surface of the photoreceptor. The exposure device selectively attenuates the potential on the circumferential surface of the photoreceptor drum by emitting light thereto based on image data, and forms the electrostatic charge image. The developing device uses the toner to develop the electrostatic charge image formed on the circumferential surface of the photoreceptor drum, and thereby forms a toner image on the circumferential surface of the photoreceptor drum. The transfer device transfers the toner image formed on the photoreceptor drum, to a sheet. The cleaning device removes, from the photoreceptor drum, residual toner that remains on the circumferential surface of the photoreceptor drum after transferring the toner image to the sheet.

The image forming apparatus further has a fixing device having a heat roller and pressure roller. The fixing device fixes the toner image onto the sheet by heating and pressurizing the sheet to which the toner image is transferred.

The developing device has a housing for storing the two-component developer including the toner and the carrier, when the developer used in the present disclosure is the two-component developer. The housing is equipped with an agitating roller, a magnetic roller, and a developing roller (toner carrier), which are provided rotatably within the housing.

After the toner is replenished into the housing, the agitating roller agitates the toner along with the carrier so as to charge the toner, and evenly disperses the toner into the two-component developer. The magnetic roller carries the two-component developer, which is supplied from the agitating roller, on its circumferential surface as a magnetic brush. Note that a control blade for controlling the thickness of the magnetic brush on the magnetic roller is disposed around the magnetic roller. The developing roller is disposed in the vicinity of the magnetic roller. Only the toner is moved from the magnetic brush on the magnetic roller to a circumferential surface of the developing roller, whereby a thin toner layer is formed on the circumferential surface of the developing roller. The developing roller is also disposed a predetermined distance away from the photoreceptor drum so as to face the photoreceptor drum, and makes the electrostatic charge image on the photoreceptor drum visible by moving the toner from the thin toner layer on the circumferential surface of the developing roller to the photoreceptor drum ("moving" here also means flying the toner from the circumferential surface of the developing roller to the circumferential surface of the photoreceptor drum when the circumferential surface of the developing roller is away from the circumferential surface of the photoreceptor drum (touchdown development method)).

The image forming apparatus may be designed for one-component developer, or may be a tandem color image forming apparatus that has an intermediate transfer belt on which toner images in different colors are superimposed one by one before a color image is transferred to a sheet.

EXAMPLE

The present disclosure is described hereinafter in further detail by using examples. The present disclosure, however, is not limited to these examples.

[Producing the Developer]

(Preparation of Silica A)

Dimethyl polysiloxane in an amount of 100 g and 3-aminopropyltrimethoxysilane in an amount of 100 g (manufactured by Shin-Etsu Chemical Co., Ltd.) were dissolved in 200 g toluene and was diluted 10 times with the toluene. While agitating 200 g of fumed silica Aerosil 90G (manufactured by Nippon Aerosil Co., Ltd.), the obtained diluted solution was allowed to gradually drip thereto and agitated while being irradiated with ultrasonic waves for 30 minutes, and, as a result, a mixture was obtained. This mixture was heated in a high temperature tank at 150° C. Thereafter, the toluene was distilled out by using a rotary evaporator. Thus obtained solid product was dried by a reduced-pressure dryer at 50° C. so that the weight of the solid product no longer decreases. Thus the obtained product was subjected to a heating process under a nitrogen stream in an electric furnace at 200° C. for three hours. The resultant powder was ground by a jet mill and collected with a bag filter, to obtain silica A having a primary particle diameter of 0.02 μm.

(Preparation of Titania A)

ATO (antimony-doped tin oxide) fine particles SN-100P (with a primary particle diameter of 20 nm, manufactured by Ishihara Sangyo Kaisha, Ltd.) in an amount of 100 g was added to 500 g of titanium oxide CR-EL (with a primary particle diameter of 0.25 μm, manufactured by Ishihara Sangyo Kaisha, Ltd.), and thus obtained mixture was mixed by the Henschel mixer at a speed of 40 m/s for five minutes, to obtain conductive titania. The conductive titania in an amount of 400 g was introduced in place of the 200 g fumed silica Aerosil 90G, and titania A having a primary particle diameter of 0.25 μm was obtained in the same manner as the silica A.

(Preparation of Titania B)

Titania B was obtained in the same manner as the titania A, other than the 5-minute mixing process using the Henschel mixer at a speed of 20 m/s.

(Preparing for Titania C)

In place of the ATO fine particles SN-100P, ITO (tin-doped indium oxide) fine particles SUFP-HX (with a primary particle diameter of 20 nm, manufactured by Sumitomo Metal Mining Co., Ltd.) in an amount of 100 g was added to the 500 g titanium oxide CR-EL, and then the same processes as those for obtaining the titania A were performed so as to obtain titania C.

(Preparation of Titania D)

In place of the ATO fine particles SN-100P, AZO (aluminum-doped zinc oxide) fine particles Pazet CK (with a primary particle diameter of 30 nm, manufactured by Hakusuitech Ltd.) in an amount of 100 g was added to the 500 g titanium oxide CR-EL, and then the same processes as those for obtaining the titania A were performed so as to obtain titania D.

(Preparation of Titania E)

In place of the ATO fine particles SN-100P, GZO (gallium-doped zinc oxide) fine particles Pazet GK-40 (with a primary particle diameter of 30 nm, manufactured by Hakusuitech Ltd.) in an amount of 100 g was added to the 500 g titanium oxide CR-EL, and then the same processes as those for obtaining the titania A were performed so as to obtain titania E.

(Preparation of Titania F)

Titania F was obtained in the same manner as the titania A, other than the 20-minute mixing process using the Henschel mixer at a speed of 40 m/s.

(Preparation of Toner Base Particles A)

Polyester resin (binder resin) in an amount of 100 parts by mass, carnauba wax (release agent) in an amount of 6 parts by mass, carbon black (colorant) in an amount of 8 parts by mass, and azine charge-controlling agent in an amount of 1 part by mass were introduced and mixed together in the Henschel mixer. The resultant mixture was melt-kneaded with a two screw extruder and then cooled with a drum flaker. Next, the obtained product was roughly pulverized by a hammer mill and then finely pulverized with a turbo mill. The resultant product was classified by using an air classifier, so as to prepare toner base particles A with a volume average particle diameter of 6.57 μm and average circularity of 0.948.

(Preparation of a Carrier A)

After diluting 30 g of polyamide-imide resin in 2 liters of water, 120 g of tetrafluoroethylene/hexafluoropropylene copolymer (FEP) and 3 g of silicon oxide were dispersed therein, to obtain coating layer forming liquid. This coating layer forming liquid and 10 kg of non-coated ferrite EF-35B (manufactured by Powdertech Corporation, average particle diameter: 35 μm) were introduced to a fluidized bed coating device so as to coat a carrier. Subsequently, the obtained product was burnt at 250° C. for one hour to obtain a carrier A.

(Preparation of a Developer A)

The silica A in an amount of 50 g and the titania A in an amount of 30 g were added to 2 kg of the toner base particles A, and thus obtained mixture was mixed by the Henschel mixer at a speed of 40 m/s for five minutes, to obtain the toner A. Next, the toner A in an amount of 36 g and the carrier A in an amount of 300 g were agitated and mixed together evenly by the ball mill for 30 minutes, to obtain a developer A.

(Preparation of a Developer B)

In place of adding the 30 g titania A, the titania B in an amount of 30 g was added to the 2 kg of toner base particles, and then the same processes as those for obtaining the toner A were performed so as to obtain a toner B. Next, the toner B in an amount of 36 g and the carrier A in an amount of 300 g were agitated and mixed together evenly by the ball mill for 30 minutes, to obtain a developer B.

(Preparation of a Developer C)

In place of adding the 30 g titania A, the titania C in an amount of 30 g was added to the 2 kg of toner base particles, and then the same processes as those for obtaining the toner A were performed so as to obtain a toner C. Next, the toner C in an amount of 36 g and the carrier A in an amount of 300 g were agitated and mixed together evenly by the ball mill for 30 minutes, to obtain a developer C.

(Preparation of a Developer D)

In place of adding the 30 g titania A, the titania D in an amount of 30 g was added to the 2 kg of toner base particles, and then the same processes as those for obtaining the toner A were performed so as to obtain a toner D. Next, the toner D in an amount of 36 g and the carrier A in an amount of 300 g were agitated and mixed together evenly by the ball mill for 30 minutes, to obtain a developer D.

(Preparation of a Developer E)

In place of adding the 30 g titania A, the titania E in an amount of 30 g was added to the 2 kg of toner base particles, and then the same processes as those for obtaining the toner A were performed so as to obtain a toner E. Next, the toner E in an amount of 36 g and the carrier A in an amount of 300 g were agitated and mixed together evenly by the ball mill for 30 minutes, to obtain a developer E.

(Preparation of a Developer F)

In place of adding the 30 g titania A, the titania F in an amount of 30 g was added to the 2 kg of toner base particles, and then the same processes as those for obtaining the toner A were performed so as to obtain a toner F. Next, the toner F in an amount of 36 g and the carrier A in an amount of 300 g were agitated and mixed together evenly by the ball mill for 30 minutes, to obtain a developer F.

(Preparation of a Developer G)

Without adding the titania A, the same processes as those for obtaining the toner A were performed to obtain a toner G. Next, the toner G in an amount of 36 g and the carrier A in an amount of 300 g were agitated and mixed together evenly by the ball mill for 30 minutes, to obtain a developer G.

(Evaluation of the Developers)

The prepared developers were placed in a digital color copy machine of Kyocera Mita Japan Corporation (product name "TASKalfa 500ci") to evaluate a maldistribution of the conductive fine particles within the non-transferred toner and the presence/absence of pinholes on the photoreceptor, under the following conditions.

(Maldistribution of the Conductive Fine Particles)

After 100,000 images were printed out continuously at a printing ratio of 5%, the recovered toner (non-transferred toner) that is discharged from the photoreceptor unit was analyzed using a fluorescent X-ray measuring device. The green strength of each of the resultant elements in the non-transferred toner, such as tin (Sn), antimony (Sb), indium (In), gallium (Ga), and aluminum (Al), was measured to see how much it was increased in relation to these elements of the initial toner. Consequently, the existence ratio of the conductive fine particles within the non-transferred toner (conductive fine particles/non-transferred toner) with respect to the existence ratio of the conductive fine particles within the initial toner (conductive fine particles/initial toner) was calculated.

(Pinholes on the Photoreceptor)

Whether pinholes were generated on the photoreceptor or not was examined after continuously printing out 100,000 images at printing ratios of 5% and 10%. When there were no pinholes, the result was marked as "○," and when at least one pinhole was generated, the result was marked as "x."

The results of the evaluation test that was performed in the manner described above are shown in Table 1.

TABLE 1

| Name of sample | Conductive fine particles | Attachment strength | Maldistribution in non-transferred toner (times) | Presence/absence of pinholes | Brand of conductive fine particles |
|---|---|---|---|---|---|
| Example 1 | Toner A | ATO | Normal | 12.1 | ○ | SN-100P |
| Example 2 | Toner B | ATO | Weak | 15.6 | ○ | SN-100P |
| Example 3 | Toner C | ITO | Normal | 11.3 | ○ | SUFP-HX |
| Example 4 | Toner D | AZO | Normal | 9.7 | ○ | Pazet CK |
| Example 5 | Toner E | GZO | Normal | 10.5 | ○ | Pazet GK-40 |
| Comparative Example 1 | Toner F | ATO | Strong | 7.5 | X | SN-100P |
| Comparative Example 2 | Toner G | None | | | X | |

As is clear from Table 1, in the toners A to E (Examples 1 to 5) in which the degree of attachment of the conductive fine particles to the inorganic fine particles is "normal" to "weak," the existence ratio of the conductive fine particles within the non-transferred toner is at least 9.5 times the existence ratio of the conductive fine particles within the initial toner, there were no pinholes formed on the photoreceptor.

On the other hand, in both the toner F (Comparative Example 1) in which the degree of attachment of the conductive fine particles to the inorganic fine particles is "strong" and the toner G (Comparative Example 2) with no conductive fine particles, pinholes were generated on the photoreceptor. Moreover, the existence ratio of the conductive fine particles within the non-transferred toner of the toner F was less then 9.5 times the existence ratio of the conductive fine particles within the initial toner (7.5 times).

As a result, it was confirmed that the generation of pinholes on the photoreceptor can be prevented well by setting the degree of attachment of the conductive fine particles to the inorganic fine particles such that the existence ratio of the conductive fine particles within the non-transferred toner becomes at least 9.5 times the existence ratio of the conductive fine particles within the initial toner.

This application is based on Japanese Patent application No. 2010-121642 filed in Japan Patent Office on May 27, 2010, the contents of which are hereby incorporated by reference.

Although the present disclosure has been fully described by way of example, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image forming method comprising:
   using a charging device to impart a predetermined potential to a circumferential surface of a photoreceptor drum,
   using an exposure device to form an electrostatic latent image on the circumferential surface of the photoreceptor drum,
   using a developing device and a toner to develop the electrostatic latent image on the circumferential surface of the photoreceptor drum, and to thereby form a toner image on the circumferential surface of the photoreceptor drum,
   using a transfer device to transfer the toner image formed on the photoreceptor drum to a sheet,
   using a cleaning device to remove from the photoreceptor drum residual toner that remains on the circumferential surface of the photoreceptor drum after transferring the toner image to the sheet, wherein
   the toner is an electrostatic charge image developing toner in which an external additive is added to toner base particles, wherein
   the external additive comprises inorganic fine particles attached with conductive fine particles, and
   the conductive fine particles are attached to the inorganic fine particles such that an existence ratio of the conductive fine particles in a non-transferred toner (conductive fine particles/non-transferred toner) is 9.5 to 30 times an existence ratio of the conductive fine particles in an initial toner (conductive fine particles/initial toner), the non-transferred toner being a toner that remains on a surface of a photoreceptor after the toner image is transferred.

2. The image forming method according to claim 1, wherein the conductive fine particles are conductive oxide fine particles.

3. The image forming method according to claim 2, wherein the conductive oxide fine particles are tin oxide conductive fine particles or zinc oxide conductive fine particles.

4. The image forming method according to claim 1, wherein a primary particle diameter of the conductive fine particles is 5 to 30 nm.

5. The image forming method according to claim 1, which is used in an image forming apparatus that has a photoreceptor drum using an amorphous silicon photoreceptor.

* * * * *